April 16, 1957
M. J. HAPPE
2,788,988
TRAILER IMPLEMENT FRAME CONSTRUCTION FOR
TRACTOR DRAWN AND POWERED IMPLEMENTS
Filed Sept. 17, 1952
4 Sheets-Sheet 1
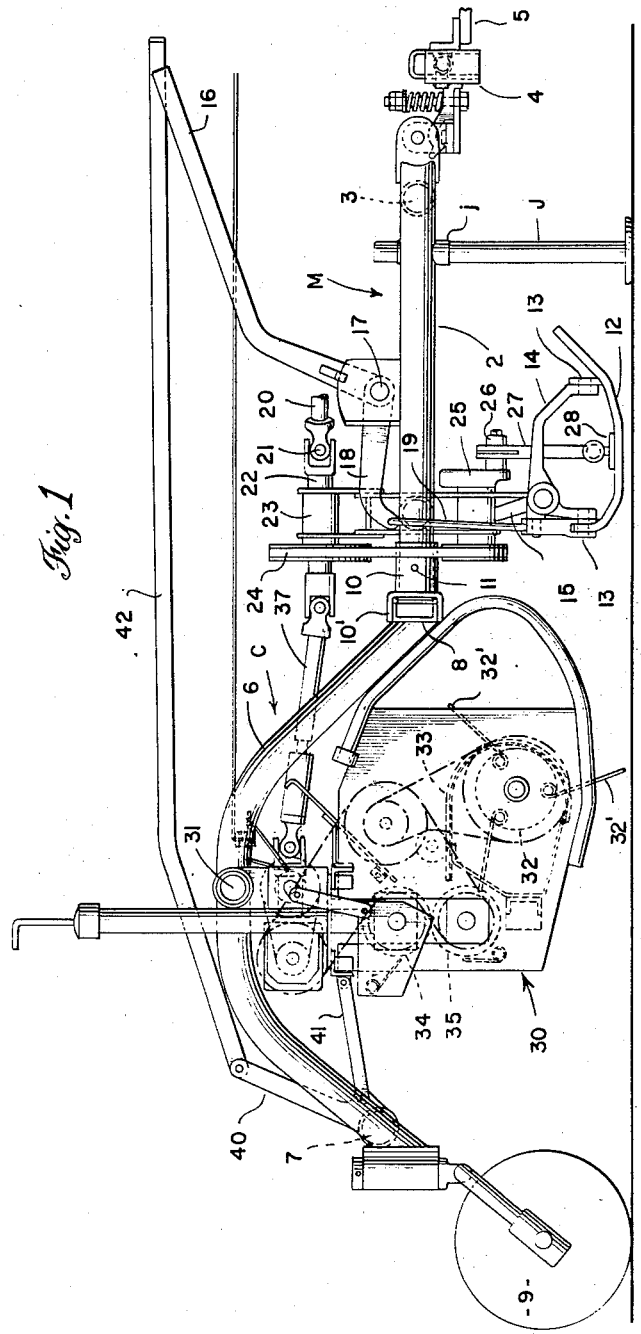
INVENTOR
Melvin J. Happe
By Richard E. Babcock Jr.
ATTORNEY

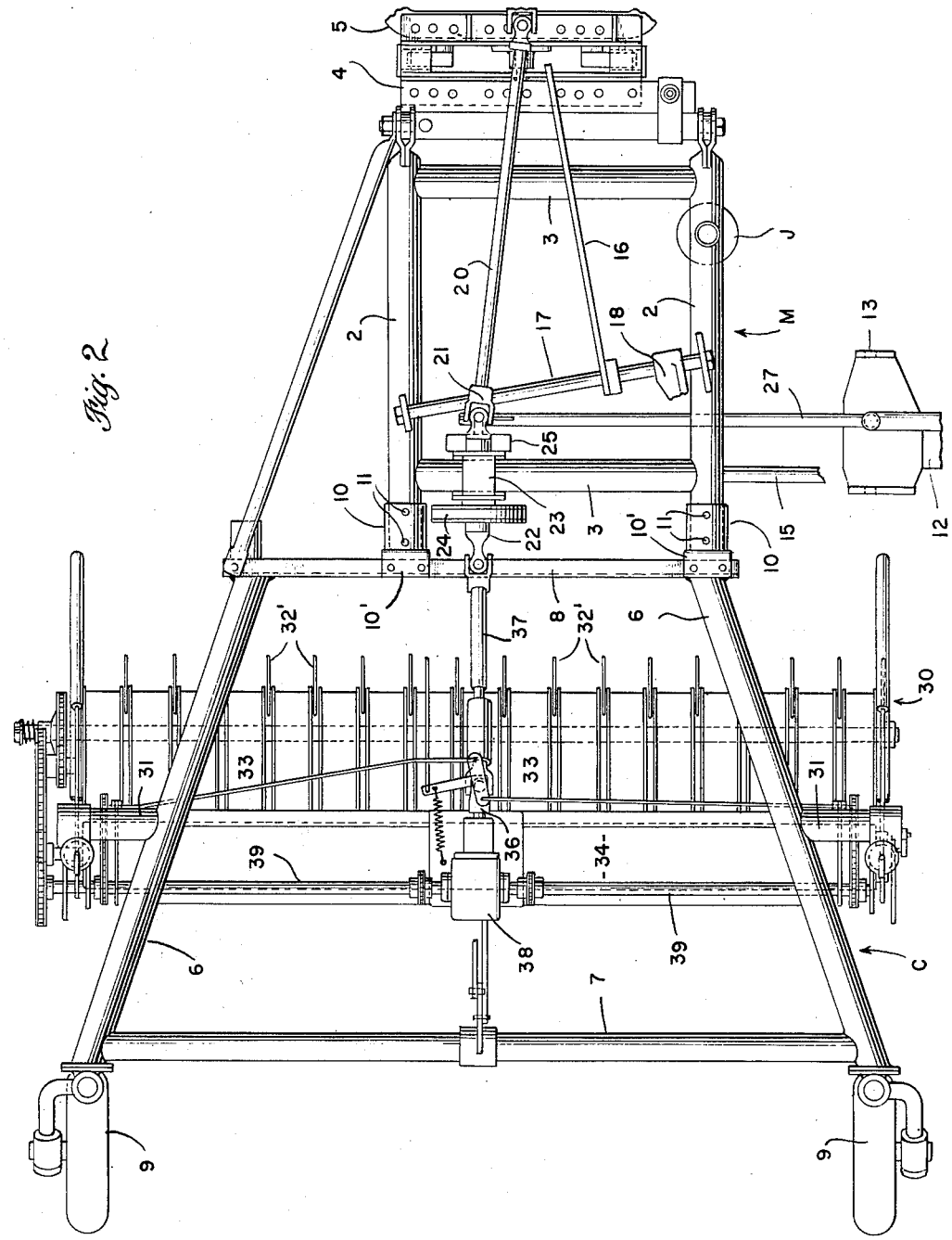

April 16, 1957 M. J. HAPPE 2,788,988
TRAILER IMPLEMENT FRAME CONSTRUCTION FOR
TRACTOR DRAWN AND POWERED IMPLEMENTS
Filed Sept. 17, 1952 4 Sheets-Sheet 3
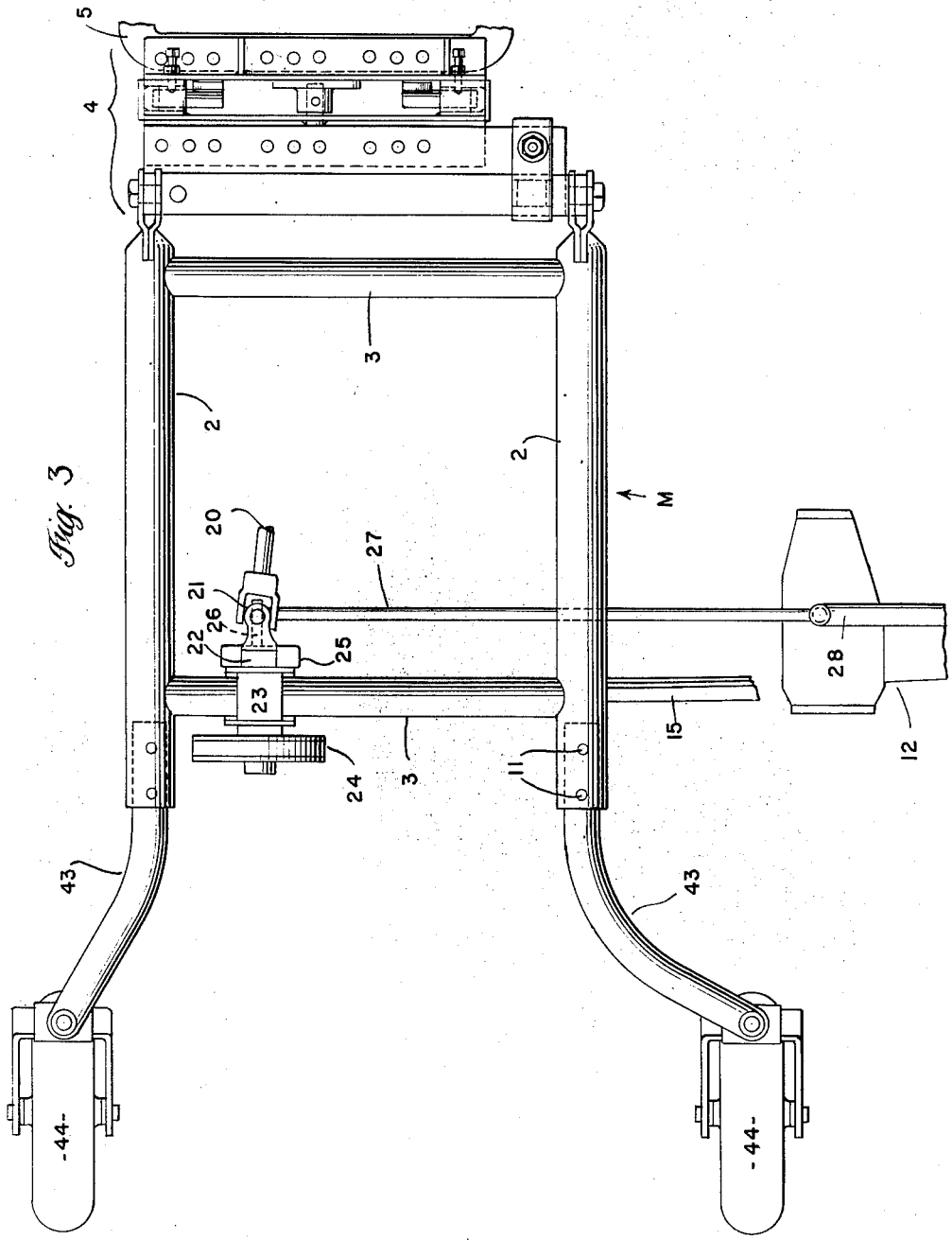
INVENTOR
Melvin J. Happe
By Richard E. Babcock Jr.
ATTORNEY April 16, 1957 M. J. HAPPE 2,788,988
TRAILER IMPLEMENT FRAME CONSTRUCTION FOR
TRACTOR DRAWN AND POWERED IMPLEMENTS
Filed Sept. 17, 1952 4 Sheets-Sheet 4
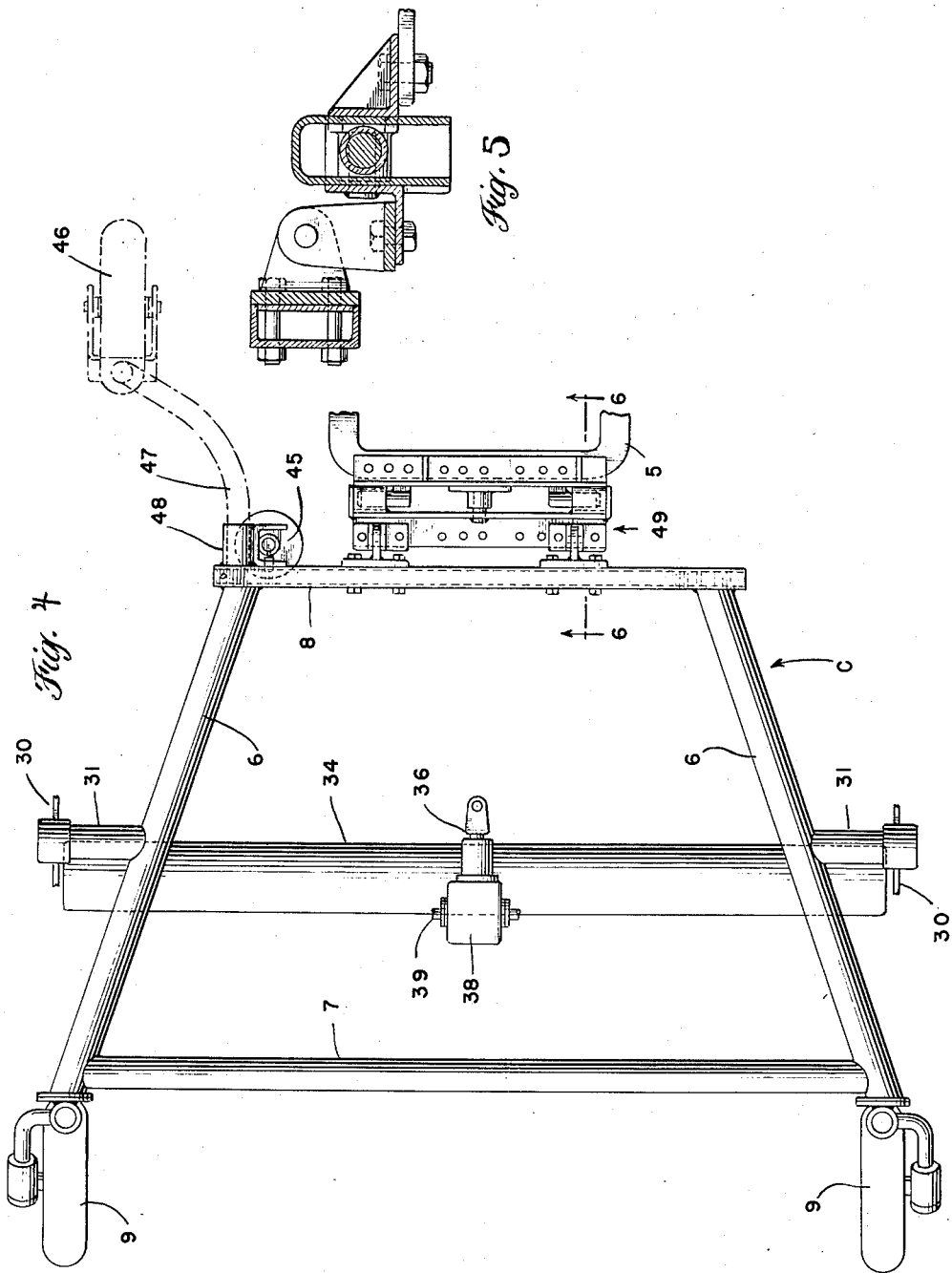
INVENTOR
Melvin J. Happe
By Richard E. Babcock Jr.
ATTORNEY

United States Patent Office 2,788,988
Patented Apr. 16, 1957

2,788,988

TRAILER IMPLEMENT FRAME CONSTRUCTION FOR TRACTOR DRAWN AND POWERED IMPLEMENTS

Melvin J. Happe, New Holland, Pa., assignor, by mesne assignments, to Sperry Rand Corporation, a corporation of Delaware Application September 17, 1952, Serial No. 310,041

1 Claim. (Cl. 280—415)

This invention relates to an implement frame construction especially adapted for use in connection with tractor drawn and powered farm implements.

It is a primary object of the instant invention to provide an implement frame with parallel rearwardly projecting frame elements adapted for rigid telescopic connection with the frame of a cooperating implement, whereby the two implements may be interconnected as single operative unit or else may be separated and used individually.

By virtue of the rearwardly projecting tubular members of the first mentioned implement frame, same may be partially supported either by the cooperating frame which is adapted to trail same, or when used by itself, by caster wheels or the like the supporting shanks of which are telescopically connected with the said frame members.

Preferably the trailing implement frame and also the leading implement frame are both adapted at their forward ends for connection to a usual tractor or other implement towing element.

Moreover, the power drive mechanisms for the various power implements supported on the frames are arranged so that both may be connected in series to the power take-off mechanism of a tractor, or where the said implements are used separately, the drive mechanism of either may be similarly connected to the power take-off of the tractor.

The foregoing objects and advantages are attained by the implement frame construction illustrated in the accompanying drawings in which:

Figure 1 is a side elevation showing a mower frame and a hay crusher frame rigidly connected to function as a unit in accordance with the preferred embodiment of the invention;

Figure 2, a plan view of the mechanism shown in Figure 1, portions of the drive mechanisms of the mower and also the crusher being either omitted or shown fragmentarily for clarity of illustration;

Figure 3, a plan view of the mower frame as adapted for use separate from the crusher unit, the mower frame being operatively connected to a tractor draw-bar, illustrated fragmentarily, and fitted with rear caster wheels;

Figure 4, an enlarged plan view of the crusher unit adapted for use by itself, certain portions of the crusher mechanism and the pick-up mechanism being omitted for purposes of clarity; and, Figure 5, a cross-section through the hitch employed with the crusher unit, same being taken on the line 6—6 of Figure 4 looking in the direction of the arrows.

Referring now in detail to the accompanying drawings, the invention is illustrated in Figures 1 and 2 as applied to a combined hay mowing and crushing unit of the type generally exemplified in the Getz U. S. Patent 2,592,269, though as shown in Figures 3 and 4 the features of the present invention make possible the disassociation of the mower unit and the crusher unit from each other and the adaptation of each for use apart from the other. As is best shown in Figures 1, 2, and 3, the mower frame M comprises a pair of relatively spaced coextensive longitudinal frame members 2, each preferably of tubular metal construction, and cross-frame members 3 connecting the side frame members 2. A usual forwardly disposed draw-bar 4 at the front end of the frame M provides means for connecting same to the drawbar 5 (shown fragmentarily) of a usual farm tractor which may provide motive power for both frames while also supporting the front end of frame M. A conventional jack J provides means for supporting the front end of the frame M when same is disconnected from the tractor drawbar, or for positioning it for connection to the drawbar. When not in use, such jack may be retracted to inoperative position through its guide sleeve J in the frame member 2.

The crusher frame C may be of any usual rigid construction, as exemplified by the illustrated arrangement employing the medially upwardly arched side frame members 6 connected in spaced relation by cross-frame members 7 and 8 respectively and having caster wheels 9 operatively mounted at their rear depending ends. Mounted on the front cross-bar 8 to telescopically receive the relatively coterminal horizontal rear ends or portions of the mower frame members 2 respectively are cylindrical sockets or sleeves 10 having their bases 10' removably secured, as by bolting, on the crossbar 8. Suitable releasable locking means such as bolts 11 passed through the telescoped portions of the respective frame members 2 and sockets 10 serve to retain said respective members and sockets against relative axial or longitudinal displacement. By virtue of such telescopic connections it will be apparent that the frames M and C respectively may be detachably united to function as a single rigid unitary frame structure supported at its forward end by the tractor drawbar 5, and at its rear end by the caster wheels 9.

In the instant embodiment, the frame M supports a mower mechanism which is positioned to project laterally to one side thereof, while the frame C operatively supports hay pick-up and crushing mechanism, the arrangement being such that the unit is drawn around the field by a tractor, the mower cuts a swath of hay, while the mechanism supported by frame C picks up the hay from a previously mowed swath, crushes and redeposits it on the ground for curing.

However, the respective frames M and C may support other types of mechanism than the mower, pick-up, and crusher mechanisms illustrated as these merely exemplify various types of mechanisms which may be carried by the respective frames.

The mower mechanism comprises the conventional cutter bar 12 which as best shown in Figure 2 is hinged at 13 to a yoke 14 carried by supporting arm 15 which is swingably supported on the frame M in usual manner. Raising and lowering of the cutter bar 12 is accomplished through a hand lever 16 (Figures 1 and 2) keyed on a rock shaft 17, a crank arm 18 similarly fixed on the rock shaft 17 being connected by a link 19 to the cutter bar 12 at a location eccentric to its hinged axis 13.

Driving power for the mower is transmitted from the power take-off of the tractor through a shaft 20 which is universally connected at 21 to a through shaft 22 rotatably supported in bearing 23 on the frame M. A belt drive 24 transmits the rotation of the shaft 22 to the rotary mower drive element 25 which in turn is eccentrically connected at 26 with the pitman 27 to transmit reciprocating movement to the sickle bar 28 guided for reciprocation on the cutter bar 12.

An auxiliary frame 30 swingably supported from the main crusher frame C for movement about axis 31 supports both the pick-up and the crusher mechanism, the specific forms of which are not important to the instant invention. Suffice it to say that the pick-up mechanism comprises a usual rotary pick-up reel 32 having tines 32' operating between stripper bars 33 to pick up hay from the ground and deliver it rearwardly over the stripper bars 33 between the vertically opposed crushing rolls 34 and 35 which function to crush the stems of the hay and to then redeposit it on the ground for drying.

The main drive shaft 36 for the crusher may be universally connected by an extensible shaft 37 to the rear end of the through mower shaft 22 to receive rotation from the power take-off of the tractor. The crusher drive shaft 36 has its rear end journalled in a gear box 38 on the crusher frame through which it transmits rotation to a cross shaft 39 and thence, through a conventional arrangement of sprockets and chains, best shown in Figure 2, to the opposed crusher rolls 34, 35, and the pickup reel 32.

Adjustment of the auxiliary frame 30 as required to raise or lower the pickup reel 32 may be accomplished through a lever 40 fulcrumed on the rear cross-bar 7 of the crusher frame, and connected to the swingably suspended auxiliary frame 30 by a rigid link 41 at points eccentric both to the fulcrum of the lever 40 and to the axis of suspension 31 of the auxiliary frame 30. A forwardly projecting operating link 42 pivotally connected to the free end of the lever 40 will permit adjustment of the auxiliary frame to the desired operating position with a sufficient mechanical advantage to permit easy manual actuation and control of the lever 40.

When it is desired to use the mower apart from the crusher, the rear ends of frame members 2 are removed from the sockets 10 after first disconnecting or removing the locking means or bolts 11, and also, the telescoping or extensible transmission shaft 37 is uncoupled from shaft 22. Then the supporting shanks 43 of caster wheels 44 may be inserted into the rearwardly opening hollow ends or sockets of the frame members 2 and firmly secured therein by the bolts 11. Such separation of the mower and the crusher frames may if desired be effected without uncoupling the mower from the drawbar 5 of the tractor. Thereafter the mower may be used by itself in conventional manner.

In order to support the front end of the crusher frame during detachment of the mower frame therefrom, it may be desirable to employ a conventional jack 45 as shown in Figure 4, or alternatively if desired the front end of the crusher frame may be supported by caster wheel 46 (indicated in dotted lines in Figure 4) having its supporting shank 47 secured in a sleeve or socket 48 on the front cross-bar 8 of the crusher frame. Such a caster wheel 46 has proved of advantage in actual practice in that it permits easy maneuvering of the crusher frame to move it away from the mower frame in the process of disconnecting the two, and it also serves to facilitate positioning of the crusher frame for connection either to the mower frame or to a tractor drawbar.

In order to adapt the crusher frame for connection directly to a tractor drawbar, the coupling members or sockets 10 may be removed from the front cross-bar 8 and replaced by a conventional drawbar or hitch structure designated 49 in its entirety, as in Figure 4.

Having thus described my invention I claim:

In agricultural machinery the combination of a first implement support, a second implement support, and removeable means for linking said supports, said first implement support comprising a pair of spaced, parallel frame members, each having a forward end and a rear end, a transverse drawbar connecting said forward ends, said drawbar being connectable to and supportable by a tractor, and a cross bar connecting said parallel frame members adjacent their rear ends, said second implement support comprising a pair of spaced frame members each having a forward end and a rear end, cross members connecting said frame members, a pair of spaced wheels, means connecting said wheels to said frame members so that said wheels support said frame members above the ground, a pair of forwardly projecting sockets, and means supporting said sockets from the forward ends of said frame members, said sockets being disposed for telescopic reception of the rear ends of said parallel frame members to support the rear end of said first implement support, and said removeable linking means being disposed at the telescopic connection between said implement supports to prevent axial displacement of said parallel frame members in said sockets.

References Cited in the file of this patent

UNITED STATES PATENTS

| 1,106,104 | Marx | Aug. 4, 1914 |
| 1,892,004 | Reid | Dec. 27, 1932 |
| 2,150,350 | Vargas | Mar. 14, 1939 |
| 2,320,775 | Garner | June 1, 1943 |
| 2,379,371 | Moschel et al. | June 26, 1945 |
| 2,410,508 | Lamme | Nov. 5, 1946 |
| 2,459,961 | Pollard | Jan. 25, 1949 |
| 2,552,770 | D'Artenay | May 15, 1951 |
| 2,562,817 | Pethick | July 31, 1951 |
| 2,592,269 | Getz | Apr. 8, 1952 |
| 2,592,928 | Martin | Apr. 15, 1952 |
| 2,657,939 | Beebe | Nov. 3, 1953 |
| 2,663,574 | Martin | Dec. 22, 1953 |
| 2,696,090 | Harrington | Dec. 7, 1954 |

FOREIGN PATENTS

| 935,708 | France | Feb. 9, 1948 |